(12) United States Patent
Wilkes et al.

(10) Patent No.: US 6,361,215 B1
(45) Date of Patent: Mar. 26, 2002

(54) JOURNAL BEARING

(75) Inventors: Joseph J Wilkes, Holland; Ascanio M DeCamillo, Norristown, both of PA (US)

(73) Assignee: Kingsbury, Inc., Philadelphia, PA (US)

( * ) Notice: Subject to any disclaimer, the term of this patent is extended or adjusted under 35 U.S.C. 154(b) by 0 days.

(21) Appl. No.: 09/518,702

(22) Filed: Mar. 3, 2000

(51) Int. Cl.[7] .................................................. F16C 17/03
(52) U.S. Cl. ...................................... 384/117; 384/311
(58) Field of Search ................................ 384/117, 122, 384/311, 309, 306

(56) References Cited

U.S. PATENT DOCUMENTS 3,891,281 A * 6/1975 Jenness
4,291,926 A * 9/1981 Tomioka et al.
5,795,076 A * 8/1998 Ball et al.

* cited by examiner

*Primary Examiner*—Lenard A. Footland
(74) *Attorney, Agent, or Firm*—John F. A. Earley; John F. A. Earley, III; Harding, Earley, Follmer & Frailey (57) ABSTRACT

A journal bearing having a working surface for contacting a shaft, and channels provided on the working surface and being configured to collect lubricant and redirect lubricant across the bearing working surface. A method for lubricating a bearing assembly is provided where lubricant is delivered to the working surface of the bearing, the lubricant is collected on the surface and directed to areas of the bearing surface which are in need of lubricant to provide an even coverage of lubrication across a bearing working surface.

17 Claims, 7 Drawing Sheets

JOURNAL BEARING

BACKGROUND OF THE INVENTION

1. Field of the Invention

This invention relates to bearings, and more particularly to bearings which have lubricated bearing surfaces.

2. Description of the Prior Art

A number of conventional bearing assemblies are known which operate with the use of lubricants to prolong the life of the bearing and the apparatus in which the bearings are used, as well as to increase the efficiency of the bearing. Vibrations are encountered as a result of the loads and other forces which are imparted to the bearings and contacting surfaces. Administering lubricants to a bearing surface is challenging because in many instances the bearing surfaces which require the lubrication are in contact with another surface.

U.S. Pat. No. 4,568,204, which issued on Feb. 4, 1986 to William S. Chambers and is assigned to Kingsbury, Inc., the assignee of the current invention, and which is incorporated herein by reference, discloses a journal bearing with a leading edge oil distribution groove. The oil distribution grove directs the oil against the working faces of the shoes where it is needed. The journal bearing of the '204 patent provides an improved bearing which conserves oil.

In the operation of bearings, there are generally different ways to run the bearings. For example, a bearing can be run flooded, whereby a sufficient quantity of oil is delivered to the bearing to provide as much oil as the bearing needs. However, in some cases, although flooding the bearing with an endless supply of oil may minimize vibrations, it is not efficient. In many bearing applications, it is preferred to run bearings evacuated, and not flooded. This is generally done to conserve power and to enable the bearing to run cooler.

While certain bearing vibrations may be considered to be minimal, it is often important to reduce even these vibrations as much as possible. To this effect, some specifications for machinery require that certain tolerances be met, such as, for example, a maximum vibration level. Vibration levels are often additive and take into account the total cumulation of vibration. Any subsynchronous vibration will therefore add to the total level of maximum acceptable vibration.

While periodic adjustments can be made to machinery over time in order to temper the undesirable vibrations, it is for the most part time consuming to make the adjustments. Moreover, if the vibrations are allowed to remain before an adjustment is made, the bearing instability caused by the vibrations can eventually ruin a machine, as the bearing surfaces as well as other components may wear excessively against each other.

It is known practice to admit lubricant through a hole or passageway to lubricate the surface of a bearing. Where oil is pumped through a hole, the oil is most usually abundant in those areas of the bearing surface immediately near the hole, and least abundant in the areas furthest from the hole. U.S. Pat. No. 4,568,204 provides an improvement in a journal bearing to supply lubricant to those areas of a bearing surface which are in need by providing a distribution groove on the bearing shoe work surface and utilizing o-rings to prevent spillage of oil into areas where it is not needed.

It is desirable to reduce the oil flow in a bearing lubrication system without effecting the operation of the bearing assembly. Energy conservation is promoted by reducing the power loss, reducing the amount of oil used and increasing the load carrying capabilities. A further benefit is that when the amount of oil required is reduced, the system may employ a smaller pump and other auxiliary equipment and therefore be more efficient.

It is an object of the present invention to provide a bearing assembly which has the benefits of an evacuated bearing assembly, but with the lower initial vibration levels associated with flooded bearing systems.

SUMMARY OF THE INVENTION

The present invention provides a novel bearing apparatus and method for lubricating the bearing which increases the load carrying capacity, uses less oil, consumes less power, enables the use of smaller auxiliary equipment, and is more efficient to operate than the prior bearing types.

The objects of the invention are accomplished by providing a lubricant distribution feature which facilitates coverage of a bearing working face with a lubricant across its surface. The lubricant which is admitted to the bearing surface is redirected from one location on the bearing surface to another location on the same bearing surface. Preferably, a hole or passageway in the bearing components for the admission of the lubricant, such as oil, delivers the oil to the bearing surface. Excess oil is collected from the bearing surface and redirected to those areas of the bearing surface which are in need of oil. Preferably, the redirection of the oil is accomplished to provide an even distribution of lubricant across the bearing surface. The amount of oil therefore is conserved since, what was excess oil in one area of the bearing working face is now captured and supplied to other areas without the need to increase the oil flow rate. Channels in the bearing surface are provided on each lateral edge thereof. The channels are configured to increase the contacting surface of those areas of the bearing working face which would otherwise not received a sufficient amount of oil, unless the oil was supplied in an excessive or flooded condition.

It is another object of the present invention to accomplish the above objects where the bearing is a journal bearing having a plurality of shoes positioned around a ring, and where the lubricant is redirected over the working face of the shoes to reduce the amount of oil required.

It is another object of the present invention to provide a shoe for use with bearings, and in particular with journal type bearings, which has the novel feature of redirecting the oil from one area of the shoe working face to another area which is in need of lubricant.

As used herein, the term LEG is a trademark of Kingsbury, Inc., Philadelphia, used in connection with hydrodynamic bearings.

DETAILED DESCRIPTION OF THE PREFERRED EMBODIMENTS

Figure 1:
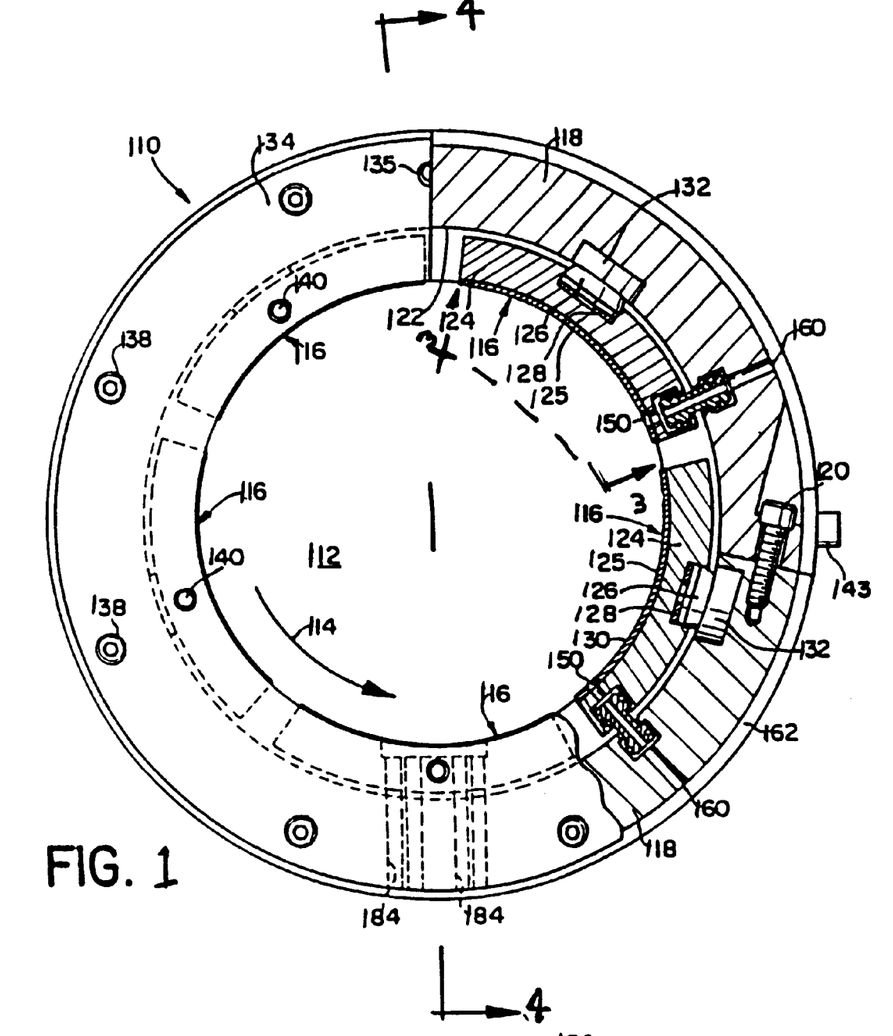
FIG. 1 is a side view of a journal bearing shown, with the improved lubrication features according to the present invention, positioned on a rotating shaft.
Figure 2:
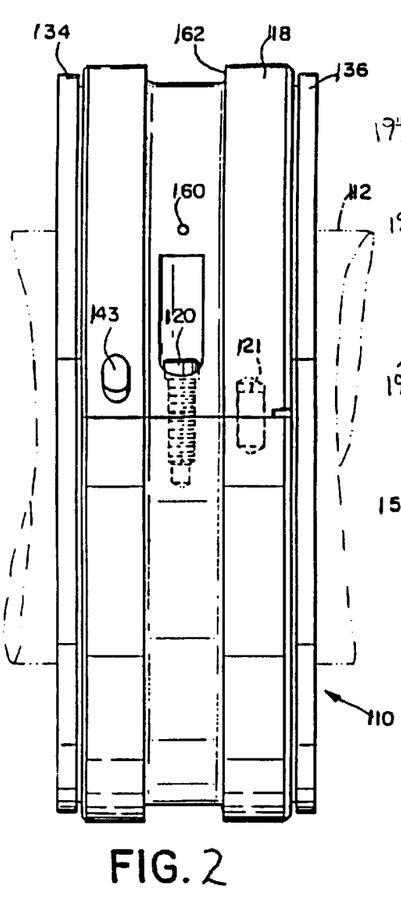
FIG. 2 is a front view in elevation of the journal bearing shown in FIG. 1.

Turning to the drawings, there is shown a journal bearing 110 constructed in accordance with a preferred embodiment of the present invention. The journal bearing 110 carries the radial load of a shaft 112 mounted for rotation therein in a direction indicated by arrow 114. The journal bearing 110 has five shoe assemblies 116 which are retained and positioned with an annular aligning ring 118. The ring 118, for example, can be provided in two split half sections which are secured together by means of joint screws 120, as shown in FIG. 2.

Referring to FIG. 1, the shoe assemblies 116 are retained within a circular inner rim 122 of the aligning ring 118 in circumferentially equally spaced relation. Each shoe assembly 116 comprises an arcuate shoe 124 provided with a bearing liner 125 on its inner surface, a shoe support 126 received in a recess hole centrally located in the outer surface of shoe 124, and a shoe support shim 128 located at the bottom of the recess hole containing the associated shoe support 126, the shims 128 being used for adjusting the position of the shoes 124 to allow for preloading of the bearing 110 as is conventional in the art. The bearing liner 125 provides a radially inwardly working face 130 of each shoe assembly 125 which face 130 is provided with the oil distributing means in accordance with the invention as will be described in detail hereafter with particular reference to FIG. 3.

Figure 4:
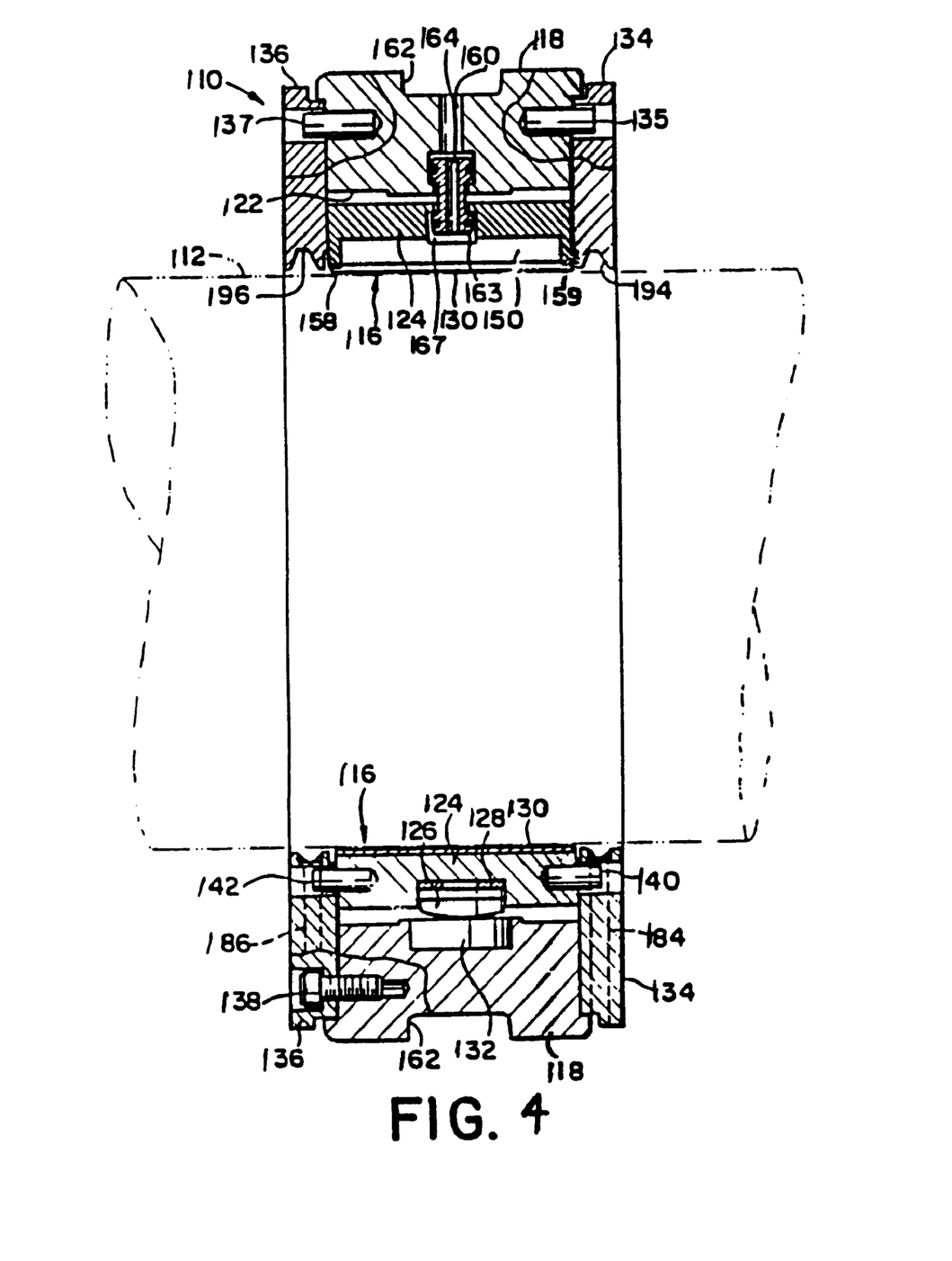
FIG. 4 is a view in section taken as indicated by the lines and arrows 4—4 of FIG. 1.

The shoe support 126 of each shoe assembly 116 is arranged to contact an insert 132 retained in aligning ring 118 in alignment with an associated shoe support 126. Each shoe support 126 and insert 132 have cooperating spherical surfaces to allow the shoe assemblies 116 to pivot freely in any direction to conform to the surface of the shaft 112 as it rotates. The shoe assemblies 116 are preferably retained axially by a pair of shoe retaining plates 134 and 136 which have an annular configuration and are made of split halves. Each of the shoe retaining plates 134 and 136 is secured to a side of aligning ring 118 by means of the plurality of circumferentially spaced screws 138 in the manner shown in FIG. 1. Each of the shoes 124 is retained in position relative to the side plates 134 and 136 by means of a pair of shoe stop pins 140 and 142, respectively, which engage the shoe 124 from each side thereof as shown in FIG. 4 and at a central location as is shown in FIG. 1. A pin 143 is provided in aligning ring 118 for locating bearing 110 in its housing.

Figure 3:
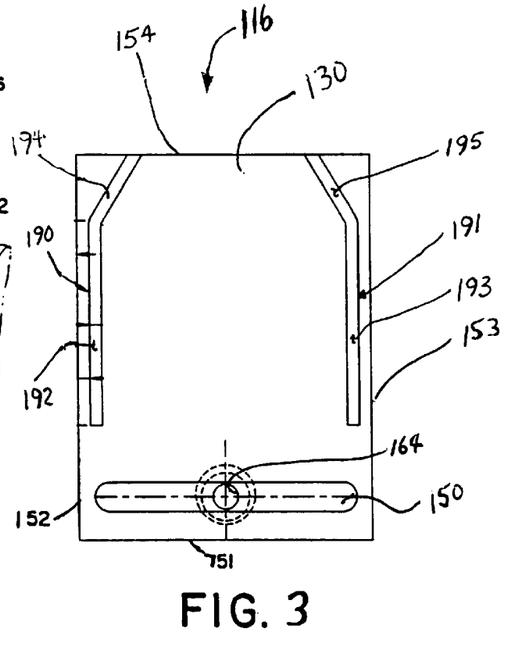
FIG. 3 is a view taken as indicated by the lines and arrows 3—3 which appear in FIG. 1.

A lubricant, such as oil, may be supplied to the working face 130 of each shoe assembly 116 by any conventional manner, such as sprays, spray bars, or drill holes that direct oil toward the shaft 112 between the shoes 16, or other methods that would deliver oil to the shaft 112 at the leading edge of the shoes 16. In the preferred embodiment of the invention illustrated herein, an oil distributing groove 150 is formed near the leading edge 151 of working face 130 of each shoe assembly 116 and has a configuration and location as is best shown in FIG. 3. The oil distributing groove 150 is located near the leading edge 151 of working face 130 and extends thereacross between the lateral edges 152 and 153 of the shoe working face 130.

In the preferred embodiment of the invention illustrated herein, an oil supply hole 160 is associated with each shoe assembly 116. The oil supply hole 160 is provided, as shown in FIG. 1, to extend radially through the aligning ring 118 at a location aligned with the center of the oil distribution groove 150. Preferably, the outer end of each oil supply hole 160 communicates with a circumferentially extending oil inlet groove 162 (FIG. 5) which cooperates with the housing for journal bearing 110 to define an oil inlet conduit extending circumferentially around the exterior of aligning ring 118 for use in delivering oil supply thereto into the outer end of each oil supply hole 160.

Figure 5:
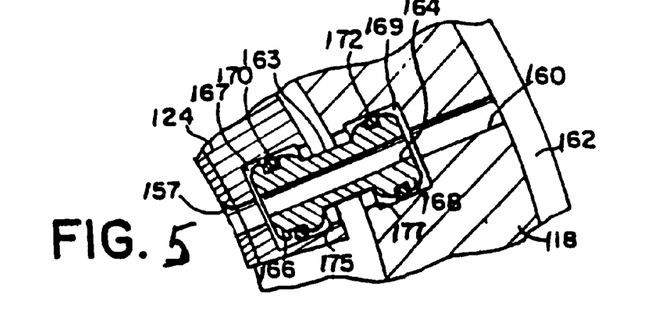
FIG. 5 is an enlarged view of an oil feed tube as shown in FIG. 1.

Oil is delivered to the oil distributing groove 150 by any conventional means. For example, as shown in FIG. 5, each shoe assembly 116 may be provided with an oil feed tube assembly 163 providing a radially extending passage 164 extending radially between the associated oil supply hole 160 and an opening formed by a socket 167 communicating with the center of oil distributing groove 150, as shown in FIG. 1. Each oil feed tube assembly 163 has ball-shaped portions 166 and 168 formed at the ends thereof and received in sockets 167 and 169 formed in shoe 124 and aligning ring 118, respectively. Ball-shaped portions 166 and 168 are preferably provided with O-rings 170 and 172, respectively, constructed and arranged to contact the walls of sockets 167 and 169 in sealing engagement so that each oil feed tube assembly 163 is sealed against oil leakage. A shoulder 175 is formed in the opening of socket 167 for retaining portion 166 of the tube assembly 163 in engagement with shoe 124, and similarly, a shoulder 177 is formed at the opening to socket 169 for retaining the other end 168 of oil feed tube assembly 163 in engagement with aligning ring 118.

Oil feed tube assembly 163 performs a dual function. Besides supplying oil from the oil supply hole 160 to the oil distribution groove 150 and preventing oil leakage from the tube assembly 163 because of the O-rings 170 and 172, the oil feed tube assembly 163 also assists in retaining the shoe 124 in position on the aligning ring 118. Also assisting in retaining the shoes 124 in ring 118 are the retainer pins 140 and 142 which extend from the shoe 124 into the retaining plates 134 and 136 as described above (FIG. 4).

Each of the retaining plates 134 and 136 is provided with four vertically extending discharge holes 184 and 186, (FIG. 4), respectively for suitable draining of oil to a suitable oil collector for recirculation to the oil system, as is conventional in the art.

Means for directing lubricant (e.g., oil) from a first location on the shoe working face 130 to a second location on the shoe working face 130 is shown in FIG. 3 and comprises channel means for holding lubricant therein and redirecting the lubricant to areas of the shoe working face 130 to facilitate coverage of the working face 130 with lubricant. The lubricant, such as oil, is delivered to the working face 130 through the oil supply hole 160, and through the passage 164 through which the oil emerges on the working face 130 of a shoe assembly 116. The oil supplied to the working face 130 collects in the distribution groove 150 and is drawn across the working face 130 when the shaft 112 is rotated. The channel means is shown preferably comprising a pair of channels 190, 191 which are formed in the working face 130 of the shoe assembly 116. The channels 190, 191 are provided to capture excess lubricant and direct lubricant from one location on the working face 130 to another location on the working face 130 where it is needed. The configuration of the channels 190, 191 facilitates an even coverage of lubricant across the working face 130 so that it is not necessary to flood the bearing 110 in order to achieve effective lubrication. The channels 190, 191 are shown each having an elongated first portion 192, 193, respectively, which is provided along side a respective lateral edge 152, 153 of the working face 130. The channels 190, 191 are also shown with a second portion 194, 195, respectively, which is connected for communication with a respective first channel portion 192, 193. The second portions 194, 195 are angled to extend across the working face 130, such that on an x-y axis, the channel portion has an x and y component. The angular portions 194, 195 of each channel directs the lubricant away from its respective lateral edge 152, 153 and toward the center of the working face 130.

In the preferred embodiment of the invention illustrated herein, the oil flow through the journal bearing 110 is described below. The oil is supplied to the groove 162 (FIG. 5) on the exterior of aligning ring 118 and flows radially inwardly through the oil supply holes 160 to the passage 164 of the associated oil feed tube assembly 163. The oil then flows from passage 164 into the center of oil distributing groove 150 and outwardly across the groove 150. As shaft 112 rotates past the leading edge 151 of each working surface 130, it draws oil from the oil distributing groove 150 along working surface 130 toward its trailing edge 154. As the oil is drawn from the groove 150, it tends to disburse across the working face 130. The oil flow is forced from the center of the working surface 130 to each lateral edge 152, 153 thereof. Channels 190, 191 capture oil moving toward the lateral edges 152, 153 of the shoe working face 130 for redistribution on the shoe working face 130. The oil moves along channels 190, 191 to fill each channel 190, 191, rather than exiting off of the working face 130, which conserves the oil and redirects it from one location to another on the working face 130. Each channel 190, 191 preferably has a respective first portion 192, 193, and a second portion 194, 195. The first portion 192, 193 of each channel 190, 191 is preferably provided to accumulate oil at each respective lateral edge 152, 153. The second portion 194, 195 of each channel is shown angled in relation to its corresponding, respective first channel portion 192, 193 to facilitate the distribution of oil across the working face 130 of the shoe 116. Oil is collected and stored in the channels 190, 191, and, as the shaft 112 is rotated, is drawn from the channels 190, 191 as needed.

The configuration of the channels 190, 191 facilitates an even coverage of lubricant across the bearing working face 130 so that it is not necessary to flood the bearing 110 in order to achieve effective lubrication.

Figure 6:
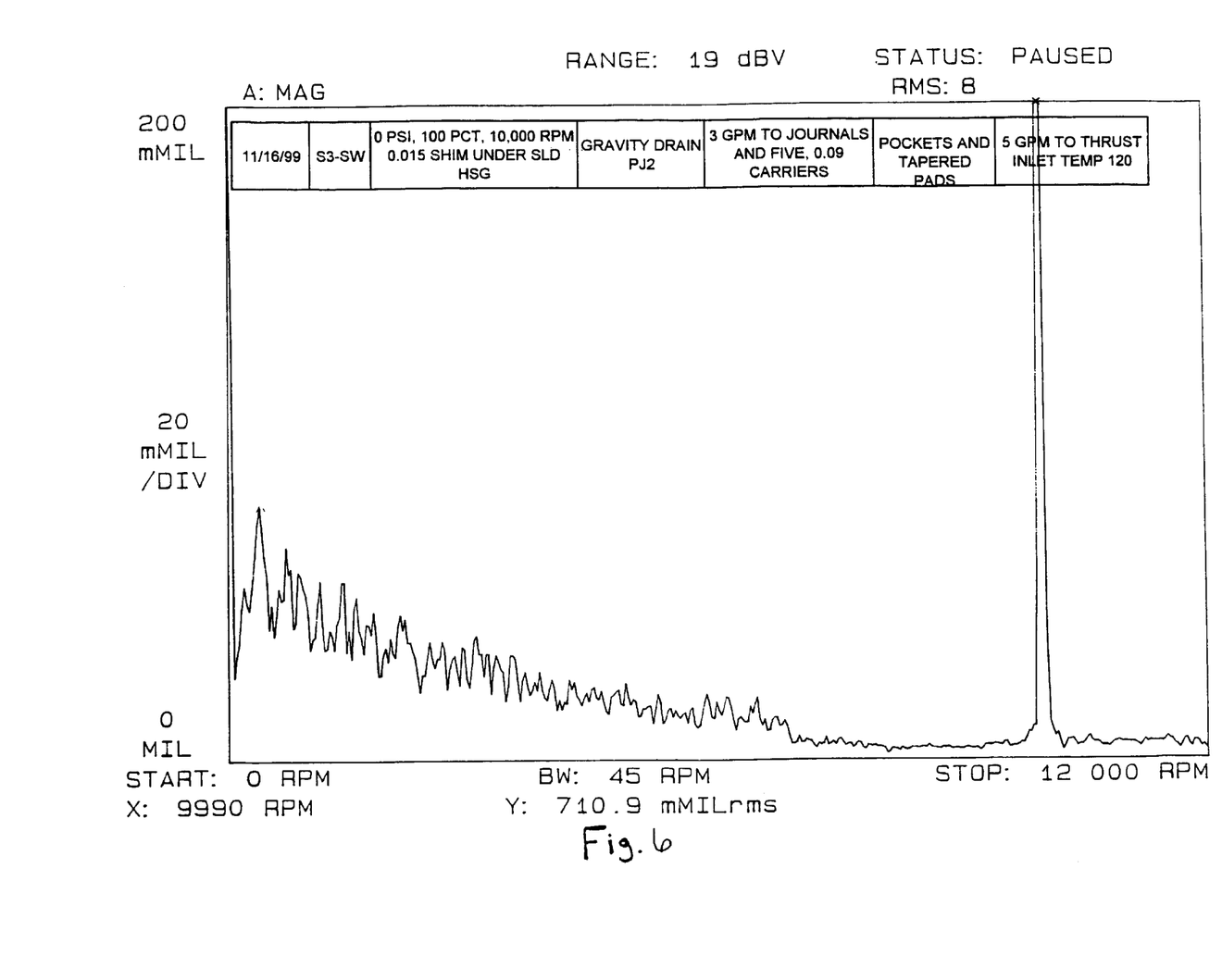
FIG. 6 is a graph which plots the vibration levels (in mMil/DIV) against shaft speed in revolutions per minute (rpm) to show broadband, subsynchronous vibrations associated with a Kingsbury LEG journal bearing run in an evacuated steady state condition at 10,000 rpm.
Figure 7:
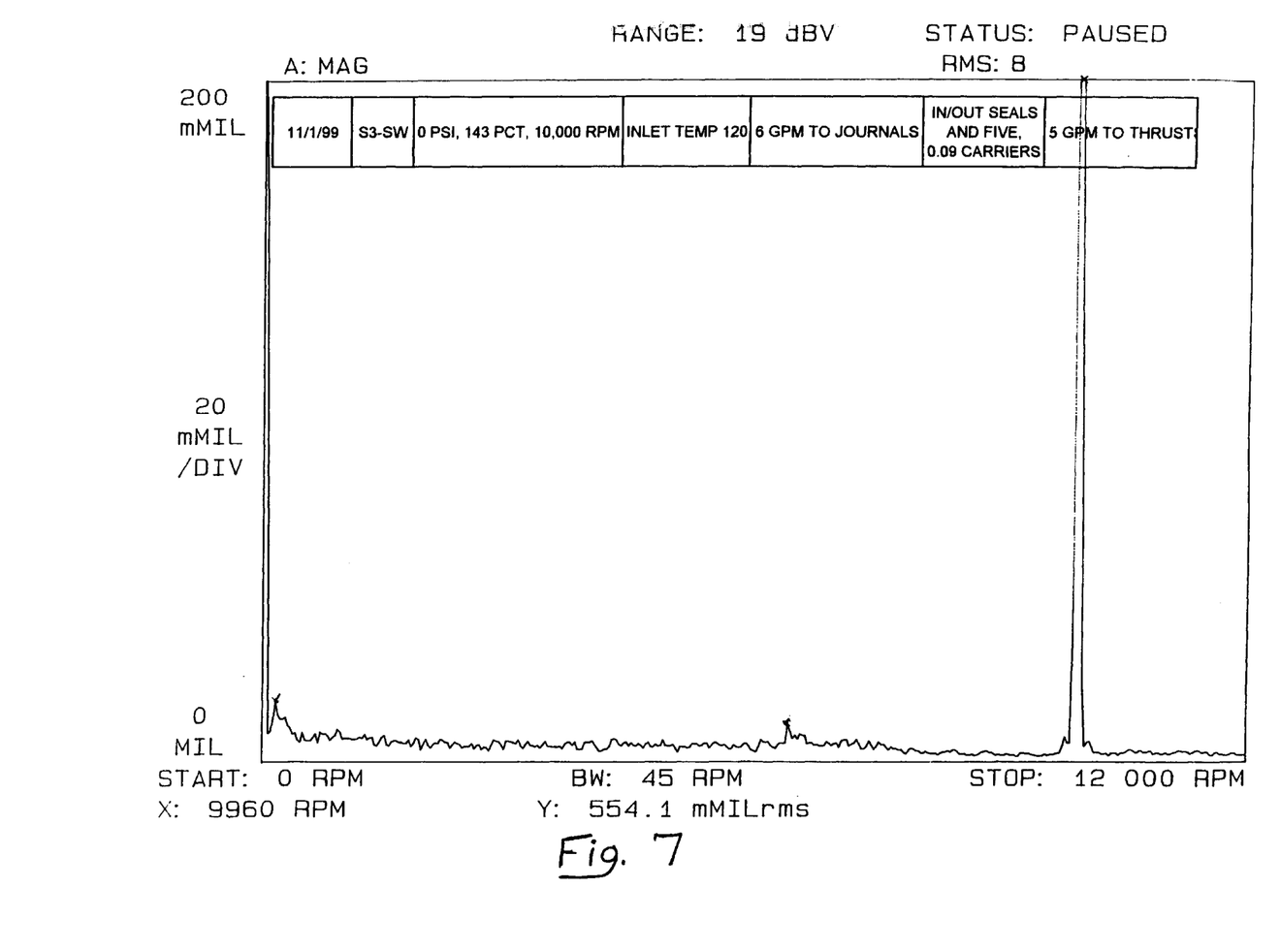
FIG. 7 is a graph which plots the vibration levels (in mMil/DIV) against shaft speed in revolutions per minute (rpm) to show broadband, subsynchronous vibrations associated with a Kingsbury LEG journal bearing run in a flooded steady state condition at 10,000 rpm.
Figure 8:
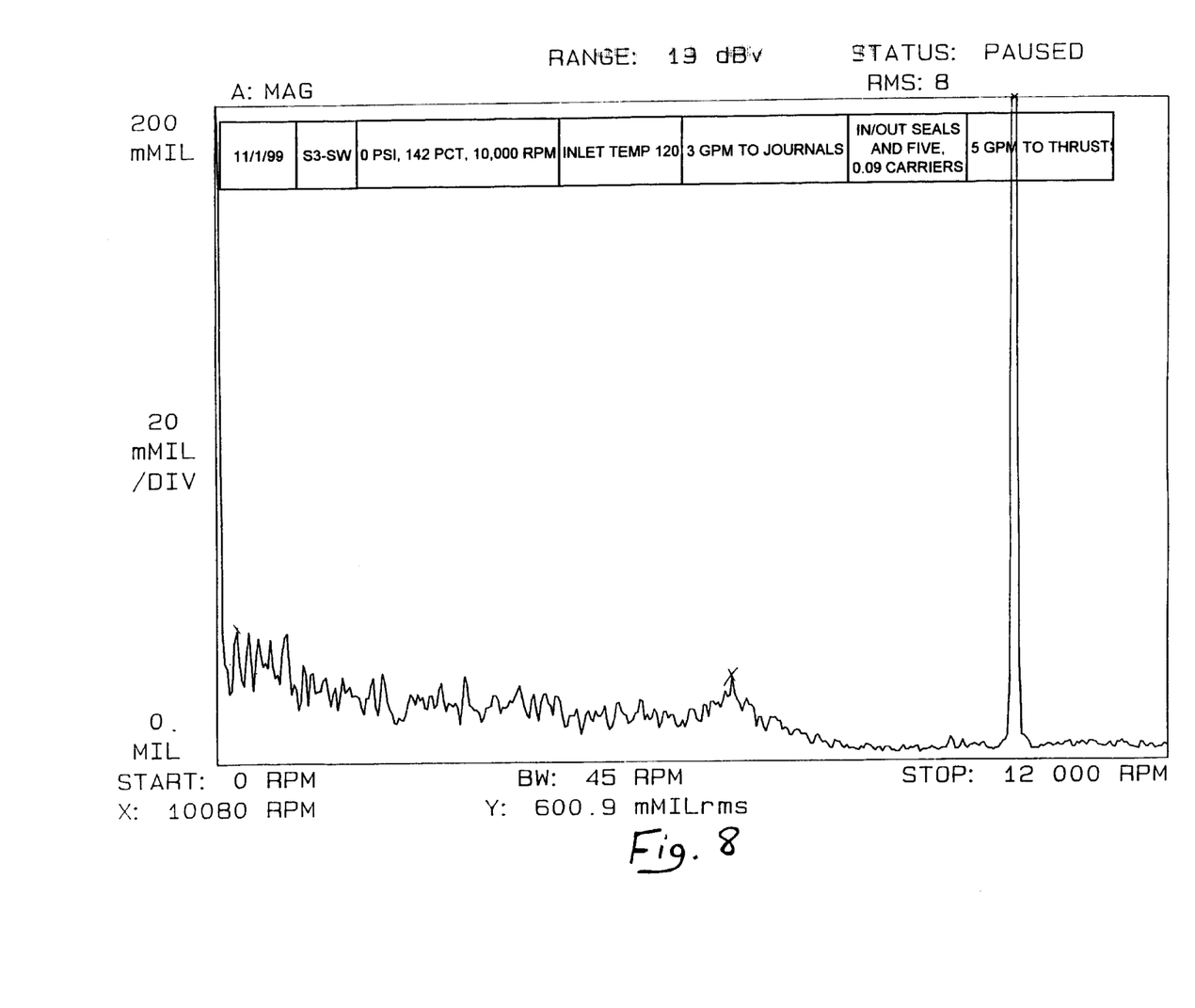
FIG. 8 is a graph which plots the vibration levels (in mMil/DIV) against shaft speed in revolutions per minute (rpm) to show broadband, subsynchronous vibrations associated with a Kingsbury LEG journal bearing run in a flooded steady state condition at 10,000 rpm, but run with a lower flow rate than the LEG bearing associated with FIG. 7.

Referring to FIGS. 6–9, the improved results obtained with a journal bearing constructed according to the present invention are shown in comparison with other bearings. FIG. 6 shows a plot of the vibration levels (in mMil/DIV) against shaft speed in revolutions per minute (rpm) where the broadband, subsynchronous vibrations associated with a Kingsbury LEG journal bearing run in an evacuated condition are observed. The graph in FIG. 6 shows vibrations for the bearing operating at a steady state condition at 10,000 rpm. In FIG. 7, where the Kingsbury LEG journal bearing was run flooded at 10,000 rpm, the vibration occurring at the subsynchronous frequency range in the first half of the speed range is relatively flat compared with that of FIG. 6. FIG. 8 shows a graph corresponding to a Kingsbury LEG journal bearing run at 10,000 rpm in a flooded condition, but with a lower oil flow rate than the LEG bearing associated with FIG. 7, the flow rate being 3 gallons per minute (gpm) for the FIG. 8 run and 6 gpm for the bearing of FIG. 7. The results of the vibration in FIG. 8 are somewhat between those observed for the bearing conditions in FIGS. 6 and 7.

Figure 9:
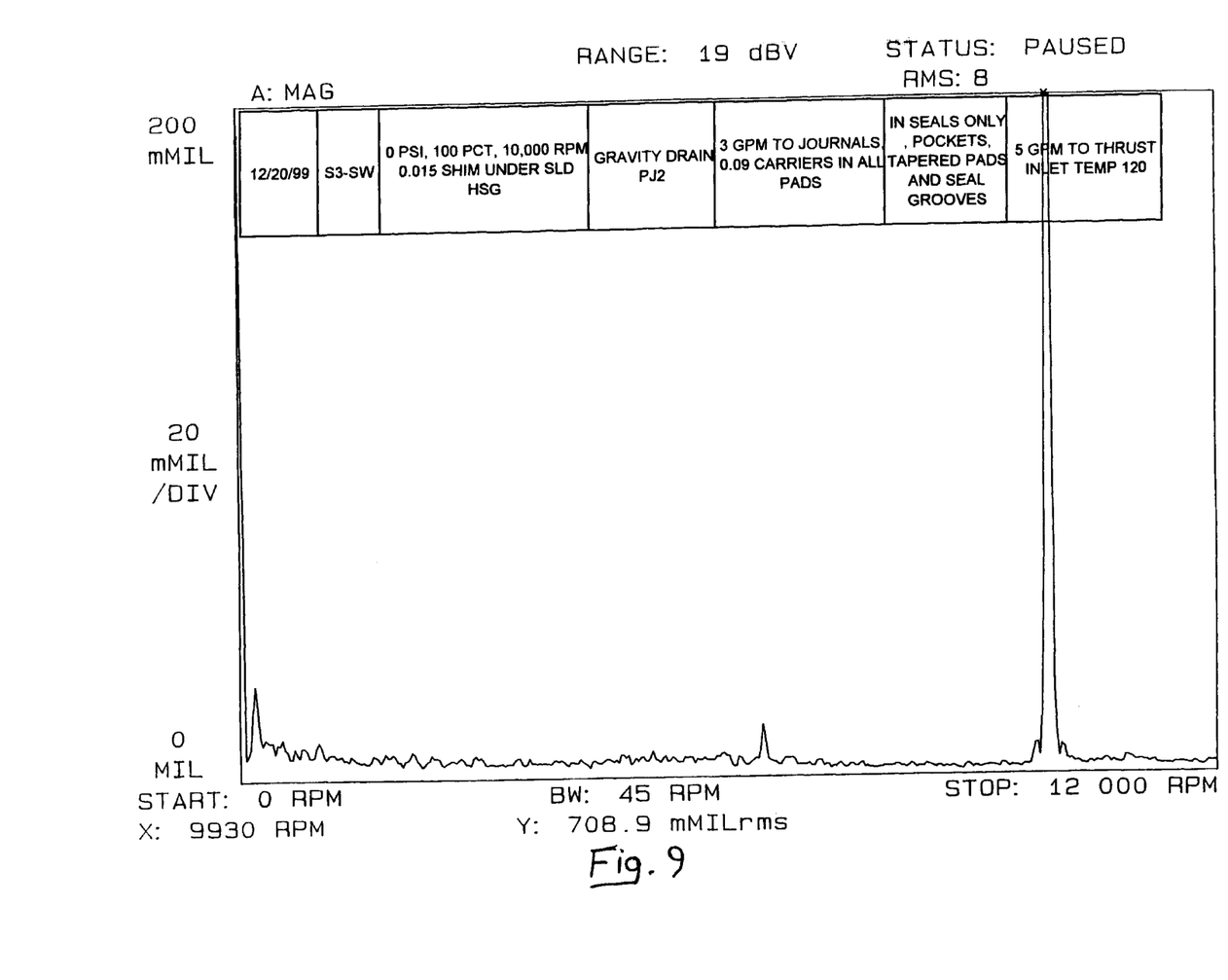
FIG. 9 is a graph which plots the vibration levels (in mMil/DIV) against shaft speed in revolutions per minute (rpm) to show broadband, subsynchronous vibrations associated with a journal bearing constructed according to the present invention and run in a steady state evacuated condition at 10,000 rpm.

The results shown on the graph in FIG. 9 appear to compare with the results shown in FIG. 7, for the flooded bearing where there is a decrease in the vibrations at the subsynchronous frequency range, particularly at the first half of the speed range (x-axis). However, the FIG. 9 results correspond to a journal bearing according to the present invention, where the bearing was run evacuated and with a flow rate of 3 gpm, which is half the flow rate of the flooded run for the bearing corresponding to FIG. 7. A comparison of the plots of FIGS. 6–9 demonstrates the improved results achieved with the present invention. In accordance with the invention, the benefits of obtaining the low vibrations at a subsynchronous range associated with a flooded bearing system are obtained with an evacuated bearing which, up to now, have not been seen.

It will be understood that while shown and described with the journal bearing referred to above, the present invention has application to other bearings, such as those which have a bearing surface which is to be kept lubricated, including bearings through which lubrication is admitted through a hole communicating with the bearing surface, and bearing shoes. These and other advantages of the present invention will be understood from a reading of the background of the invention, the summary of the invention, the brief description of the drawings, the detailed description of the preferred embodiments, and the appended claims.

We claim:

1. A journal bearing for supporting a rotating shaft, comprising:

an aligning ring;

a plurality of shoe assemblies retained within said aligning ring;

each shoe assembly including an arcuate shoe having a working face for bearing contact with the rotating shaft;

means for delivering oil to the leading edge area of said working face of each shoe;

channel means for directing lubricant from one location on said working face to another location on said shoe working face.

2. The bearing of claim 1, wherein said channel means comprises channels provided on said working face.

3. The bearing of claim 2, wherein said working face has a leading edge, a trailing edge and a pair of lateral edges, wherein each said channel has a first portion and a second portion which is angularly configured in relation to said first portion, wherein said first portion has one end near the leading edge of the working face and another end which is near the trailing edge of the working face, wherein said angularly configured portion is provided at the end of said first channel portion which is near the trailing edge of said working face.

4. The bearing of claim 2, wherein said channels are configured to dispense lubricant evenly across the working face.

5. The bearing of claim 1, wherein said means for delivering oil to the leading edge area comprises an oil distribution groove formed in said working face.

6. The bearing of claim 5, wherein said channels comprise a pair of channels, wherein each channel has a first portion which is perpendicular to said oil distribution groove and a second portion which is angled in relation to said first portion.

7. A shoe having
a working face, and
channel means formed on the working face for directing lubricant from one location on the working face of the shoe to another location on the working face of the shoe.

8. The shoe of claim 7, wherein said channel means comprises channels provided on the working face of the shoe.

9. The shoe of claim 8, wherein the working face has a leading edge, a trailing edge and a pair of lateral edges, wherein each said channel has a first portion and a second portion which is angularly configured in relation to said first portion, wherein said first portion has one end near the leading edge of the working face and another end which is near the trailing edge of the working face, and wherein said angularly configured portion is provided at the end of said first channel portion which is near the trailing edge of said working face.

10. The shoe of claim 8, wherein said channels are configured to dispense lubricant evenly across the working face.

11. The shoe of claim 7, further including means for delivering a lubricant to the leading edge area of the working face of the shoe comprising an oil distribution groove formed in said working face near the leading edge area and extending across the shoe.

12. The shoe of claim 11, wherein said channels comprise a pair of channels, wherein each channel has a first portion which is perpendicular to said oil distribution groove and a second portion which is angled in relation to said first portion.

13. A method for lubricating a bearing assembly, comprising the steps of:
providing a bearing assembly with a shoe assembly including an arcuate shoe having a working face for bearing contact with a shaft,
delivering a lubricant to said shoe working face,
collecting lubricant delivered to said shoe working face in a channel provided on said shoe working face,
storing a supply of lubricant in said channel,
administering lubricant stored in said channel to a shaft,
directing lubricant from a first location on said shoe working surface to a second location on said shoe working surface.

14. The method of claim 13, wherein the step of delivering a lubricant to said shoe working face includes delivering oil to the leading edge area and depositing the oil in an oil distribution groove provided in said working face near the leading edge area and extending across the shoe.

15. The method of claim 14, wherein the method steps of collecting, storing, administering and directing are carried out with a pair of channels, wherein each channel has a first portion which is perpendicular to said oil distribution groove and a second portion which is angled in relation to said first portion.

16. The method of claim 13, wherein the step of collecting a lubricant delivered to said shoe working face comprises collecting lubricant in channels which are configured to dispense lubricant evenly across the working face.

17. The method of claim 13, wherein the step of providing a bearing assembly comprises providing a bearing working face which has a leading edge, a trailing edge and a pair of lateral edges, wherein the lubricant is collected in a channel which has a first portion and a second portion which is angularly configured in relation to said first portion, wherein said first portion has one end near the leading edge of the working face and another end which is near the trailing edge of the working face, wherein said angularly configured portion is provided at the end of said first channel portion which is near the trailing edge of said working face.

* * * * *